United States Patent
Bitzinger et al.

(10) Patent No.: US 8,797,853 B2
(45) Date of Patent: Aug. 5, 2014

(54) SYSTEM AND METHOD FOR CHECKING THE PERMISSIBILITY OF A USE OF A SERVICE

(75) Inventors: Rudolf Bitzinger, Munich (DE); Christian Prehofer, Munich (DE); Viktor Ransmayr, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 4275 days.

(21) Appl. No.: 10/239,525

(22) PCT Filed: Mar. 7, 2001

(86) PCT No.: PCT/DE01/00863
§ 371 (c)(1), (2), (4) Date: Mar. 27, 2003

(87) PCT Pub. No.: WO01/71988
PCT Pub. Date: Sep. 27, 2001

(65) Prior Publication Data
US 2003/0161267 A1 Aug. 28, 2003

(30) Foreign Application Priority Data
Mar. 23, 2000 (DE) .................................. 100 14 522

(51) Int. Cl.
H04L 12/26 (2006.01)
H04L 12/66 (2006.01)
G06F 15/16 (2006.01)

(52) U.S. Cl.
USPC ................ 370/230; 370/395.21; 370/395.42; 370/401; 709/232; 709/249; 709/250

(58) Field of Classification Search
USPC ......... 370/231, 338, 446, 238, 351, 448, 230, 370/395.21, 395.42, 401; 709/232, 249, 709/250
See application file for complete search history.

(56) References Cited

U.S. PATENT DOCUMENTS 5,392,286 A * 2/1995 Tanaka et al. ................. 370/231
5,740,075 A * 4/1998 Bigham et al. ............... 709/229
5,862,126 A   1/1999 Shah et al.
6,091,725 A * 7/2000 Cheriton et al. .............. 370/392

(Continued)

FOREIGN PATENT DOCUMENTS

| EP | 0 673 138 A2 | 9/1995 |
| EP | 0 883 324 A2 | 12/1998 |
| WO | WO 99/66676 | 12/1999 |

OTHER PUBLICATIONS

XP-000956310: "An Experimenal Study of Assured Services in a Diffserv IP QoS Network." By N. Seddigh et al., c. Nov. 1998.

(Continued)

*Primary Examiner* — Alpus H Hsu
(74) *Attorney, Agent, or Firm* — King & Spalding L.L.P.

(57) ABSTRACT

An access control function (ZF) which checks a requested use (NU) of a service (DI) by considering an available capacity $C_v$ which is detected by considering the entire transmission capacity (G) and is available to an access node (ZK) for transmitting traffic flows (VS) to the communications network. The service is carried out in at least one communications network (KN) that is provided with an entire transmission capacity (G). The access node (ZK) is allocated to the access control function (ZF) which checks the requested use (NU) of the service (DI).

13 Claims, 1 Drawing Sheet

(56) References Cited

U.S. PATENT DOCUMENTS

| | | | |
|---|---|---|---|
| 6,118,791 A * | 9/2000 | Fichou et al. | 370/468 |
| 6,452,915 B1 * | 9/2002 | Jorgensen | 370/338 |
| 6,690,679 B1 * | 2/2004 | Turunen et al. | 370/469 |
| 6,798,776 B1 * | 9/2004 | Cheriton et al. | 370/392 |
| 7,023,860 B1 * | 4/2006 | Mauger | 370/401 |
| 8,174,979 B2 * | 5/2012 | Charzinski et al. | 370/235 |
| 8,233,934 B2 * | 7/2012 | Ahmavaara et al. | 455/552.1 |
| 2003/0002531 A1 * | 1/2003 | Charzinski et al. | 370/468 |

OTHER PUBLICATIONS

"Computer-Netzwerke" by Andrew S. Tanenbaum, c. 1990.

* cited by examiner

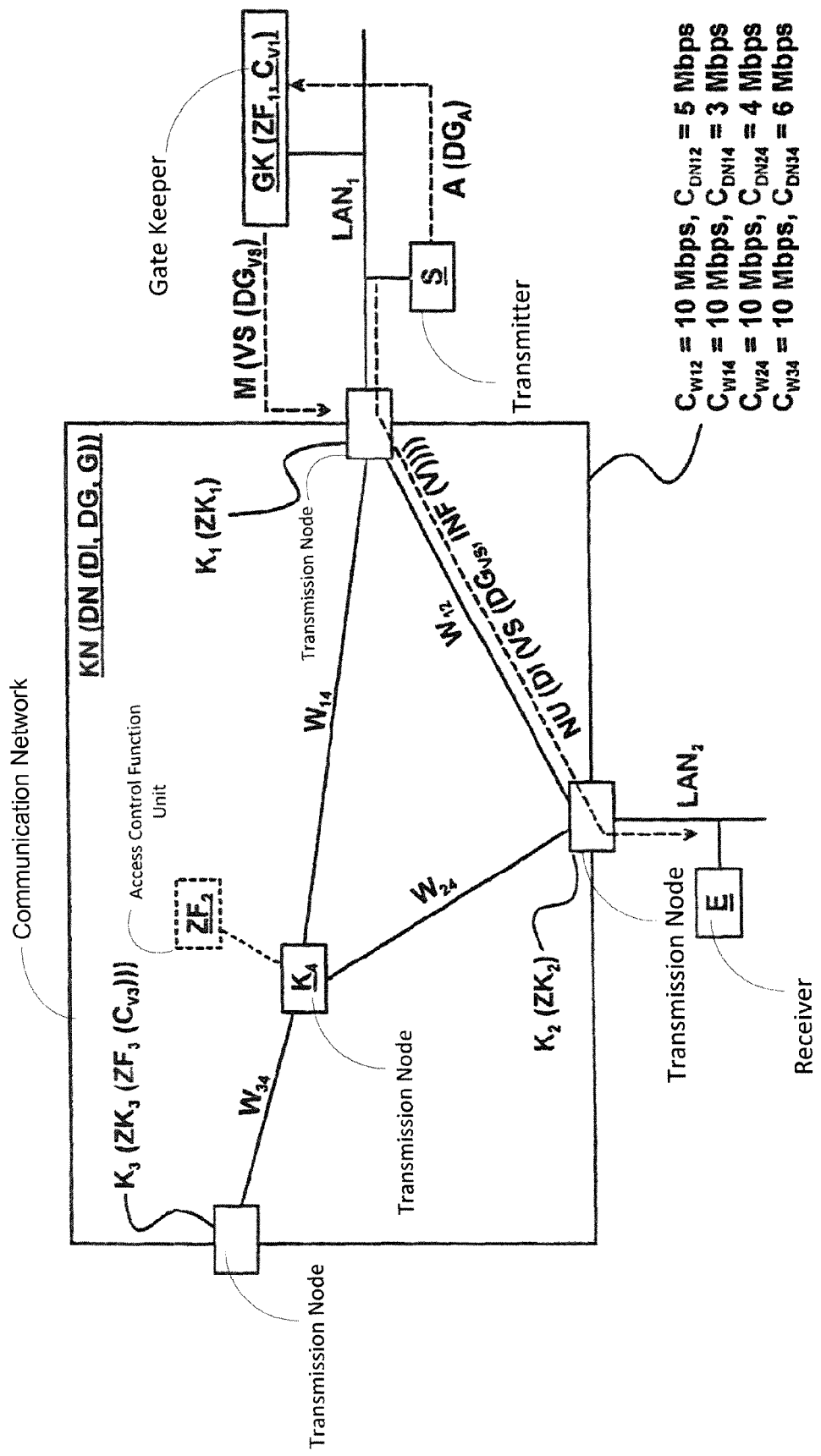

SYSTEM AND METHOD FOR CHECKING THE PERMISSIBILITY OF A USE OF A SERVICE

CLAIM FOR PRIORITY

This application claims priority to International Application No. PCT/DE01/00863 which was published in the German language on Sep. 27, 2001.

TECHNICAL FIELD OF THE INVENTION

The invention relates to a system and method for checking the permissibility of a use of a service.

BACKGROUND OF THE INVENTION

Contemporary packet-oriented communications networks—also referred to as "data networks"—have previously been designed essentially for transmitting packet streams which are also referred to in the specialist field as "data packet streams". Hence, there is usually no need for an ensured transmission service quality level. The transmission of the data packet streams thus takes place, for example, with delays whose timing fluctuates as the individual data packets of the data packet streams are usually transmitted in the sequence of their network access, i.e. the timing delays become longer the more packets are to be transmitted by a data network. In the specialist field, the transmission of data is therefore also referred to as a transmission service without real time conditions or as a non-real time service.

In the course of the convergence of line-oriented speech networks and packet-oriented data networks, real time services, i.e. transmission services under real time conditions such as the transmission of speech information or moving image information, are increasingly also being implemented in packet-oriented communications networks, i.e. the transmission of the real time services which have previously usually been transmitted in a line-oriented fashion is being carried out in a packet-oriented fashion, i.e. in packet streams, in a convergent speech-data network. These packet streams are also referred to as "real time packet streams". Here, the problem arises that for an implementation of a real time service which is embodied as a packet-oriented transmission a high level of service quality is necessary for the implementation to remain comparable in, terms of quality with a line-oriented transmission. In particular, a minimum—for example <200 ms—delay without fluctuations in the delay is important as real time services generally require a continuous stream of information, and cannot compensate a loss of information, for example due to packet losses, by repeated transmission of the discarded packets. As these service-quality-level requirements basically apply to all communications networks with packet-oriented transmission, they are independent of the specific refinement of a packet-oriented communications network. The packets can consequently be embodied as Internet packets, X.25 packets or frame-relay packets, but also as ATM cells. Data packet streams and real time packet streams are, in this case, exemplary embodiments of traffic streams which are transmitted in communications networks.

For the transmission of speech and image information via the packet-oriented Internet—also referred to as "VoIP"—protocols for a transmission over the Internet have been proposed in the international standards—in particular the H.323 standard. Here, the network is divided into a plurality of "H.323" zones in which what are referred to as "gatekeepers" are respectively provided for converting E.164 telephone numbers to computer names and their Internet addresses, permissibility checking for incoming and outgoing conversations, administration of transmission capacities, registration of H.323 terminals.

However, as there is no ensured service quality level for the Internet transmission in the current H.323 standards, the current VoIP technology has the disadvantage that the quality of the transmission of speech and images decreases if the number of packets to be transmitted by the Internet rises. In this respect, the IETF (Internet Engineering Task Force) has proposed that a plurality of service classes should be introduced in the packet-oriented Internet which previously did not ensure any service quality levels, said proposal being in Blake et. al., "An Architecture for Differentiated Services", RFC 2475, 1998, ftp://venera.isi.edu/in-notes/rfc2475.txt and in Nichols et. al, "Definition of the Differentiated Services Field (DS Field) in the IPv4 and IPv6 Headers", RFC 2474, 1998, ftp://venera.isi.edu/in-notes/rfc2474.txt. Such an Internet is also referred to as 'DiffServe network'. Here, the individual packet streams are each assigned to a specific service class and, depending on their service class, are transmitted by the transmission nodes of the Internet with or without priority over packets of other service classes. The service quality level which is required for the real time services can thus be ensured, for example, by virtue of the fact that the associated real time packet streams are assigned to a service class which is transmitted with priority by the nodes of the Internet—the real time packet streams are thus prioritized with respect to the data packet streams.

By forming a class of traffic streams which are to be transmitted with priority, a (virtual) separate communications network for the transmission of the prioritized traffic streams with a separate overall transmission capacity, which comprises part of the overall transmission capacity of the Internet, is formed within the Internet. Here, that capacity which is necessary to transmit the traffic streams which are just still capable of being transmitted without loss of traffic is considered to be the overall transmission capacity of a communications network which is composed of transmission nodes and paths. In other words, this means that it would not be possible to transmit a further traffic stream in the communications network without a loss of traffic. The still available transmission capacity of a given route between two transmission nodes of the communications network accordingly depends not only on the traffic which is transmitted directly between these two transmission nodes but also on that traffic which is transmitted at least partially along the given route as a consequence of a transmission along other routes in the communications network.

In a priority-controlled transmission, network access control is basically necessary at least for the prioritized traffic as the requested service quality level can only be ensured if no more prioritized traffic is fed to the communications network than the maximum which can be transmitted by said communications network. For this purpose, network access devices—also referred to as "edge devices" or also "access nodes" from the point of view of the communications network—are proposed for the Internet with a plurality of service classes, said devices performing the network access control. In this context, the edge devices can control the volume of the traffic fed to the communications network by means of packet streams;

set priority markers in the packets corresponding to the priority of their packet streams;

monitor priority markers of packet streams and if appropriate correct them if the packets are already marked with priorities;

monitor the transmission capacity of prioritized packet streams.

Hitherto, how a permissibility check of a transmission of a packet stream which has been applied for, for example, at a gatekeeper or an edge device is to be brought about in this context has not been regulated.

A method in which resources which are necessary for the transmission of a packet stream are requested from each transmission node of a communications network using a reservation protocol RSVP, and the transmission of the packet stream does not occur if at least one transmission node cannot make available the requested resources is known. In this context, the permissibility check is checked in the transmission nodes taking into account only capacities which can be determined locally, i.e. usually the capacities of the outgoing transmission paths and/or channels. In addition, the reservation protocol RSVP must be implemented in each—i.e. even the internal—transmission node of the communications network.

SUMMARY OF THE INVENTION

The invention discloses a method for checking the permissibility of the transmission of a packet stream in a communications network.

In one embodiment of the invention, there is permissibility checking of a use, applied for with an access control function, of a service which is implemented in at least one communications network having an overall transmission capacity, during which checking the access control function checks whether the applied-for use of the service is permitted, taking into account an available capacity which is determined taking into account the overall transmission capacity and which is made available to an access node assigned to the access control function, for transmitting traffic streams to the communications network.

A number of advantages of the invention are as follows:

The access control can be adapted in a flexible way to changes in the overall transmission capacity by changing the available capacity.

The permissibility checking is carried out solely by the access control function. As a result, there is no need for the applied-for use of the service to be checked in the transmission nodes of the communications network. This entails the particularly nice advantage that the invention can be used without changing the transmission nodes of the communications network.

The use of the service can be applied for without specifying any desired service quality level. As a result, there is advantageously no need for such a service quality level to be determined by the applicant for the application for the use of the service.

According to another embodiment of the invention, there is provision that the service is embodied as a transmission of information, in particular speech information, which is brought about using traffic streams which are transmitted with priority. As a result, for example in a packet-oriented communications network, the particular service quality level requirements of a transmission of speech information in an integrated speech/data network are advantageously fulfilled.

According to still another embodiment of the invention, the overall transmission capacity depends at least partially on the transmission capacities of the transmission paths of the communications network. As a result, to the overall transmission capacity of the communications network is taken into account very efficiently as these values are static and thus can be determined without costly calculation methods. If the transmission capacities of the transmission paths are stored in the local routing tables of the transmission nodes, they can advantageously be obtained from the latter in a very efficient way and essentially without information transmissions in the communications network.

According to yet another embodiment of the invention, the checking of the permissibility is carried out taking into account a service quality level which is necessary for the use of the service and which is determined by the access control function. As a result, a traffic management system is advantageously implemented by virtue of the fact that an appropriate high service quality level is ensured, for example, for traffic streams which transmit information, for example, in real time, i.e. with the shortest possible delays and/or with a specific capacity, and an appropriately low service quality level is ensured for traffic streams which transmit information with variable delays and/or with a non-specific capacity. Examples of information which tends to be transmitted with a high service quality level are speech telephone services or image telephone services. Examples of information which tends to be transmitted with a low service quality level are email, files or Internet pages. The traffic management system can also be implemented as a function of the user of the service. For example, a regular customer is assigned a high service quality level every time he uses the service and an occasional user is assigned a lower service quality level.

According to one aspect of the invention, when a desired service quality level is specified when the use of the service is applied for, said service quality level is taken into account by the access control function in the determination of the necessary service quality level. Thus, for example a preset, necessary "on demand" service quality level is adapted to the requirements of the applicant without the preset having to be changed.

According to another aspect of the invention, there is provision for the communications network to be embodied as a DiffServ network which transmits traffic streams with an ensured service quality level in a packet-oriented fashion. The permissibility checking is carried out according to the invention on a traffic-stream-specific basis. In the application of the invention in a DiffServ network there is thus a particular advantage as in a DiffServ network there is no provision for a transmission with an ensured traffic-stream-specific service quality level, but rather that the prioritized traffic streams will be transmitted with priority.

According to an aspect of the invention, there is provision for the access control function to signal the permissibility of the traffic stream to be transmitted with priority during use of the service to the assigned access node, and for the access node to subsequently transmit the traffic stream with priority to the DiffServ network. This advantageously causes the traffic stream to be transmitted to the communications network by the access node with the necessary service quality level.

According to still another aspect of the invention, the access control function is implemented in a gatekeeper. The invention is thus advantageously integrated seamlessly into the existing infrastructure of a contemporary Internet, in particular of a DiffServ network. In addition, the permissibility checking according to the invention can be integrated into the permissibility checking of the gatekeeper defined in the H.323 standard, as a result of which the external behavior of the conventional permissibility checking remains advantageously essentially unchanged. In addition, the transmission nodes the communications network are relieved of loading as there is no need for permissibility checking in them.

BRIEF DESCRIPTION OF THE DRAWINGS

The invention is explained in more detail below with reference to a FIGURE.

FIG. 1 shows an exemplary block circuit diagram of a communications network.

DETAILED DESCRIPTION OF THE PREFERRED EMBODIMENTS

FIG. 1 shows, by way of example, a block circuit diagram of a communications network KN with an overall transmission capacity G. The communications network KN is embodied, for example, as a service DI with DiffServ network DN ensuring to a service quality level DG. The service DI is, for example, a transmission of traffic streams VS with a service quality level $DG_{vs}$ which is brought about, for example, by means of prioritized transmission of the traffic streams VS. The communications network KN will be assumed to comprise four transmission nodes K, of which the first transmission node $K_1$ is embodied as a first access node $ZK_1$, the second transmission node $K_2$ is embodied as a second access node $ZK_2$ and the third transmission node $K_3$ is embodied as a third access node $ZK_3$. Traffic streams VS are transmitted to the communications network KN by the access nodes ZK.

The transmission nodes are connected to one another by means of four transmission paths $W_{12}$, $W_{14}$, $W_{24}$ and $W_{34}$ which have transmission capacities $C_w$, the indices indicating those transmission nodes $K_i$ and $K_j$ between which the transmission path $W_{ij}$ is provided. In this context, the following capacities $C_{DN}$ is reserved for the DiffServ network DN by the transmission capacities $C_w$ of the transmission paths W:

| Transmission path W | Capacity $C_W$ | Capacity $C_{DN}$ |
|---|---|---|
| $W_{12}$ | $C_{W12}$ = 100 Mbps | $C_{DN12}$ = 5 Mbps |
| $W_{14}$ | $C_{W14}$ = 10 Gbps | $C_{DN14}$ = 3 Mbps |
| $W_{24}$ | $C_{W24}$ = 10 Gbps | $C_{DN24}$ = 4 Mbps |
| $W_{34}$ | $C_{W34}$ = 10 Mbps | $C_{DN34}$ = 6 Mbps |

A first local area network $LAN_1$ is connected to the access node $K_1$ with a transmitter S and a gatekeeper GK. A second local area network $LAN_2$ is connected to the access node $K_2$ with a receiver E.

Furthermore, a plurality of ways of implementing an access control function ZF are specified by way of example:
A decentralized, access-node-specific implementation as access control function $ZF_1$ in the gatekeeper GK which will be assumed to be assigned to the access node $ZK_1$. Permissibility checking of traffic streams VS which are to be transmitted to the communications network KN by means of the access node $ZK_1$ is carried out here taking into account a capacity $C_{v1}$ which is available for the assigned access node $ZK_1$.
A central implementation as access control function $ZF_2$ which is reached physically via the transmission node $K_4$. It is used, for example, for determining capacities $C_v$ which are respectively available for, if appropriate, access nodes K of the DiffServ network DN and which are signaled to it, for example, on request.
A decentralized, access-node-specific implementation as access control function $ZF_3$ in the access node $ZK_3$, as a result of which it is assumed to be implicitly assigned to this node. Permissibility checking of traffic streams VS which are to be transmitted to the communications network KN by the access node $ZK_3$ is carried out here taking into account a capacity $C_{v3}$ which is available for the assigned access node $ZK_3$.

In addition, the following transmissions of information are indicated:
Use NU of the service DI which is embodied, for example, as a transmission of information, during which a traffic stream VS with, for example, information INF embodied as speech information V is transmitted from the transmitter S to the receiver E along the route S=>$K_1$=>$K_2$=>E. In this context, the traffic stream VS is transmitted with a necessary service quality level $DG_{vs}$ at least in the communications network KN.
Application A from the transmitter S to the gatekeeper GK with which the use NU is applied for.
If appropriate a desired service quality level $DG_A$ is specified in the application A.
Optional signaling M by the access control function $ZF_1$ implemented in the gatekeeper GK to the assigned access node $ZK_1$ specifying the permitted traffic stream VS and, if appropriate, its service quality level $DG_{vs}$ which is necessary for the transmission.

For an exemplary embodiment of the invention it will be assumed that the access control function ZF is implemented in a decentralized and access-node-specific fashion as an access control function $ZF_1$ in the gatekeeper GK, and that the communications network KN is embodied as a DiffServ network DN.

The use NU of the service DI is applied for to the gatekeeper GK by the transmitter S with the application A. In this context, for example, the desired service quality level $DG_A$ is specified. For example, it shall be assumed that the service DI is embodied as a transmission of speech information V and a continuous transmission capacity of 64 kbps is specified as the service quality level $DG_A$.

The access checking will be assumed to take place, for example, on the basis of the following available capacities $C_v$:

| Access node | Available capacity $C_V$ |
|---|---|
| $ZK_1$ | $C_{V1}$ = 2 Mbps |
| $ZK_2$ | $C_{V2}$ = 3 Mbps |
| $ZK_3$ | $C_{V3}$ = 1 Mbps |

As a result, although less capacity $C_v$ is available to the access nodes $ZK_1$ and $ZK_2$ in the example than capacities $C_{DN}$ reserved for the DiffServ network DN on the transmission paths W, the advantage which this entails is that when each of the available capacities $C_v$ is completely exhausted, the access nodes ZK cannot exceed the capacity $C_{DN}$ reserved for the DiffServ network on any of the transmission paths W of the entire (!) communications network KN, as:
$C_{DN12}$ (5 Mbps)>=$C_{v1}$ (2 Mbps)+$C_{v2}$ (3 Mbps)
$C_{DN14}$ (3 Mbps)>=$C_{v1}$ (2 Mbps)+$C_{v3}$ (1 Mbps)
$C_{DN24}$ (4 Mbps)>=$C_{v2}$ (3 Mbps)+$C_{v3}$ (1 Mbps)
$C_{DN34}$ (6 Mbps)>=$C_{v1}$ (2 Mbps)+$C_{v2}$ (3 Mbps)+$C_{v3}$ (1 Mbps)

In this example, it is assumed that the information streams run in each case along the route with the lowest number of transmission nodes K—also referred to as "least hops". In this exemplary embodiment, the overall transmission capacity G depends essentially on the transmission capacity of the transmission paths W of the communications network KN which is embodied as a DiffServ network DN, but is not limited to it. It may also depend, for example, on the transmission capacities of the transmission nodes. With a definition of the available capacities $C_v$ which is carried out in such a way according to the invention taking into account the overall transmission capacity G of the DiffServ network DN, there is advantageously no need for permissibility checking in the internal transmission nodes K of the communications network KN.

The access control function ZF is aware of the capacity $C_{v1}$ of 2 Mbps which is made available to the access node $ZK_1$ for the transmission of traffic streams VS to the DiffServ network DN. As a result, for example 32 telephone calls with a capacity of 64 kbps which decisively influences the service quality level $DG_{vs}$, 64 telephone calls with a capacity of 32 kbps or 128 telephone calls with a capacity of 16 kbps, can be transmitted. Any other desired distributions of the service quality level DG are possible. For example, it is also possible to provide a mix, for example up to 20 telephone calls with a capacity of 64 kbps, further telephone calls, up to 20, with a capacity of 32 kbps, and the remaining up to 8 telephone calls with a capacity of 16 kbps. The latter distribution will be assumed below.

After the application A has been received, the access control function $ZF_1$ checks the permissibility of the applied-for use NU. At the time of the checking, it will be assumed that 20 telephone calls with a capacity of 64 kbps, 10 telephone calls with a capacity of 32 kbps and 3 telephone calls with a capacity of 16 kbps are permitted—i.e. of the available capacity $C_{v1}$, 1648 kbps are assigned and 400 kbps are free at the time. As a result, the applied-for use NU of the service DI is basically permitted taking into account the available capacity $C_{v1}$.

In addition, it will be assumed that there is a configuration such that the transmitter S usually carries out telephone calls with a capacity of 16 kbps if there is no desired service quality level $DG_A$ specified in the application A. The service quality level $DG_A$ of 64 kbps desired by the transmitter S is not permissible as, at the time, the 20 provided telephone calls with 64 kbps are assigned. For this reason, the access control function $ZF_1$ determines a transmission with 32 kbps, instead of the usually provided 16 kbps, taking into account the desired service quality level $DG_A$ of 64 kbps as the necessary service quality level $DG_{vs}$, and the applied-for use NU is permitted with this necessary service quality level $DG_{vs}$.

According to another embodiment of the invention, the permissibility of the applied-for use NU is signaled to the access node $ZK_1$. With an access-node-specific implementation of the access control function ZF this is carried out, for example, by virtue of the fact that a value which indicates the permissibility is stored in a storage medium of the access node ZK. When the access function ZF is implemented remotely from the access node ZK, the permissibility is transmitted to the access node ZK with, for example, at least one message M which is transmitted to the access node ZK.

It is to be noted that the invention is not restricted to DiffServ networks DN but rather can be applied in any communications network KN with service quality levels DG. For example, application is provided in local area networks $LAN_1$, $LAN_2$. Here, the access nodes ZK are embodied, for example, as access cards provided in the transmitter S or in the receiver E or as access functionalities relating to the local area networks LAN. After the permissibility has been checked according to the invention, speech information V is transmitted in the local area networks LAN with appropriate necessary service quality levels $DG_{vs}$.

What is claimed is:

1. A method for checking permissibility to use a service, the service being implemented in at least one communications network, the communication network having an overall transmission capacity, the use of the service comprising transmission of at least one service-specific traffic stream which is assigned to the service by an access node which is assigned to the service to the communication network, comprising:
    analyzing the use of the service with an access control function which is assigned to the access node; and
    checking, via the access control function, without further interrogations at internal transmission nodes of the communications network, whether the use of the service is permitted, the checking performed taking into account an available capacity, which is
        determined taking into account the overall transmission capacity, and
        available to the access node for transmitting traffic streams to the communications network.

2. The method as claimed in claim 1, wherein the service is embodied as a transmission of information which is brought about using traffic streams which are transmitted with priority.

3. The method as claimed in claim 2, wherein the access control function signals the permissibility of the traffic stream to be transmitted with priority during use of the service to the assigned access node, and the access node subsequently transmits the traffic stream with priority to DiffServ network.

4. The method as claimed in claim 1, wherein the overall transmission capacity depends at least partially on the transmission capacities of transmission paths of the communications network.

5. The method as claimed in claim 1, wherein the checking of the permissibilty is carried out taking into account a service quality level which is determined by the access control function.

6. The method as claimed in claim 4, wherein a desired service quality level is specified when the use of the service is applied for, the service quality level is taken into account by the access control function in the determination of necessary service quality level.

7. The method as claimed in claim 1, wherein the communications network is embodied as a DiffServ network which transmits traffic streams with an ensured service quality level in a packet-oriented fashion.

8. The method as claimed in claim 7, wherein the access control function signals the permissibility of the traffic stream to be transmitted with priority during use of the service to the assigned access node, and the access node subsequently transmits the traffic stream with priority to DiffServ network.

9. The method as claimed in claim 1, wherein the access control function is implemented within a gatekeeper.

10. A device comprising:
    at least one means for checking permissibility of use of a service which is implemented in at least one communications network having an overall transmission capacity, wherein the at least one means:
    transmits at least one service-specific traffic stream which is assigned to the service by an access node assigned to the service to the communications network;
    analyzes the use of the service with an access control function which is assigned to the access node; and
    checks the access and via control function, without further interrogations at internal transmission nodes of the communications network, whether the use of the service is permitted, the checking performed taking into account an available capacity,
    the overall transmission capacity, and
    which is made available to the access node for transmitting traffic streams to the communications network.

11. The device as claimed in claim 10, wherein the device is configured for connection to at least one other device by at least one transmission path to perform at least a portion of the checking.

12. The device of claim 10, wherein the device is a gatekeeper.

13. The device of claim 10, wherein the device is a transmission node.

\* \* \* \* \*